United States Patent
Konishi et al.

(10) Patent No.: US 7,209,316 B2
(45) Date of Patent: Apr. 24, 2007

(54) MAGNETIC RECORDING/REPRODUCING DEVICE INCLUDING A TAPE PULL-OUT MEMBER HAVING A PROJECTION FOR CONTACTING A RAMP SURFACE

(75) Inventors: Akio Konishi, Hyogo (JP); Yoshiyuki Saito, Osaka (JP); Takefumi Yanagihara, Ehime (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 435 days.

(21) Appl. No.: 10/811,106

(22) Filed: Mar. 26, 2004

(65) Prior Publication Data

US 2004/0207949 A1    Oct. 21, 2004

(30) Foreign Application Priority Data

Mar. 27, 2003    (JP) .............................. 2003-088424

(51) Int. Cl.
*G11B 5/665* (2006.01)
(52) U.S. Cl. .......................................... 360/85; 360/95
(58) Field of Classification Search .................. 360/85, 360/95, 130.23
See application file for complete search history.

(56) References Cited

U.S. PATENT DOCUMENTS

| | | | |
|---|---|---|---|
| 5,196,971 A * | 3/1993 | Tsuchiya et al. ............. 360/85 |
| 5,790,342 A * | 8/1998 | Konishi et al. ............... 360/95 |
| 5,949,621 A * | 9/1999 | Kinjo et al. ............. 360/291.5 |
| 5,953,185 A * | 9/1999 | Lee ....................... 360/130.23 |
| 2003/0156348 A1* | 8/2003 | Azai ........................... 360/85 |
| 2004/0061971 A1* | 4/2004 | Tsuneyoshi et al. .......... 360/85 |
| 2004/0160699 A1* | 8/2004 | Azai ........................... 360/85 |
| 2005/0094310 A1* | 5/2005 | Kondo ........................ 360/85 |

* cited by examiner

*Primary Examiner*—Jefferson Evans
(74) *Attorney, Agent, or Firm*—Renner, Otto, Boisselle & Sklar, LLP

(57) ABSTRACT

A magnetic recording and reproduction apparatus includes a cylinder; a chassis section having the cylinder provided thereon; a tape pull-out member pulling out the magnetic tape; a positioning member having a ramp surface; and an urging section for urging the tape pull-out member. The first position is a position at which information recording to, and information reproduction from, the magnetic tape is possible. The tape pull-out member has a second surface facing the first surface. The tape pull-out member includes a projection provided on the second surface. The tape pull-out member is urged by the urging section such that the projection presses the ramp surface at the first position. A force received by the projection from the ramp surface, by the projection pressing the ramp surface, acts on the projection in a direction from the ramp surface toward the first surface.

4 Claims, 10 Drawing Sheets

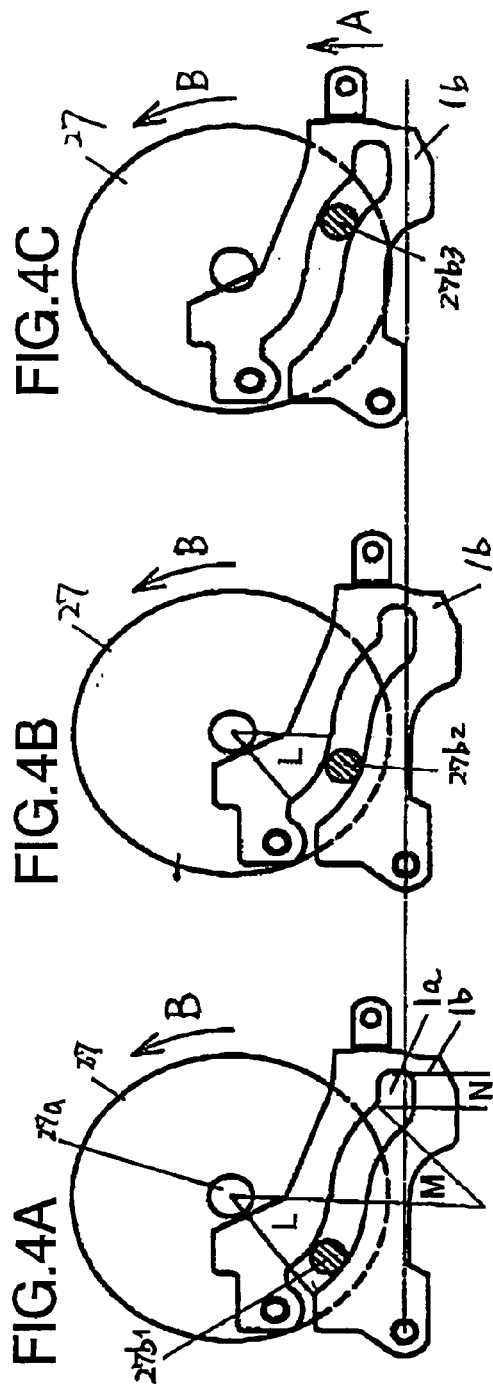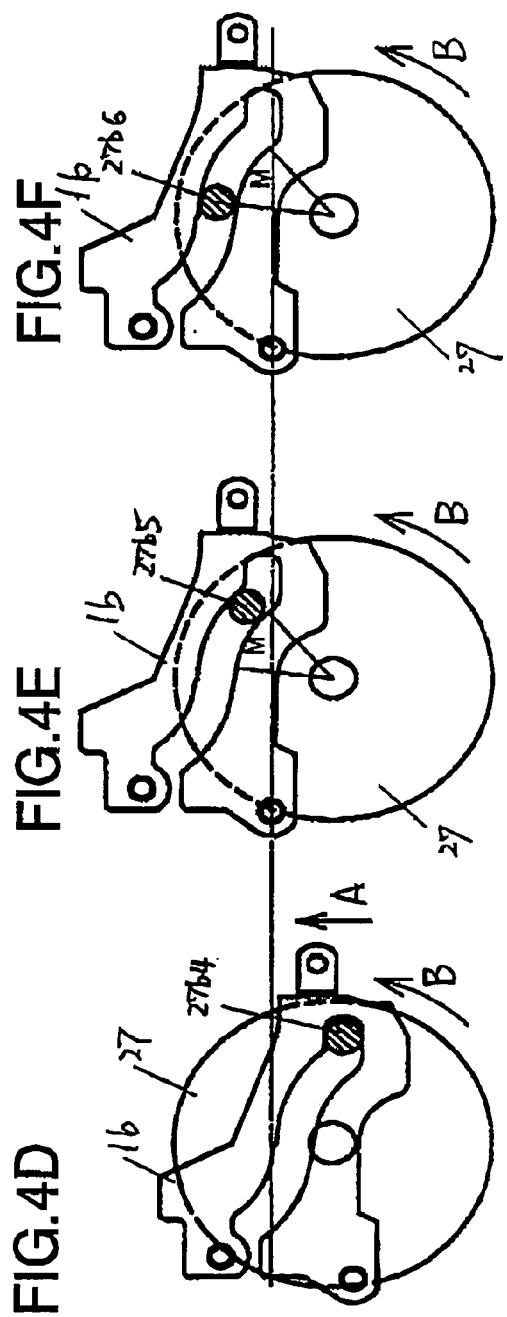

MAGNETIC RECORDING/REPRODUCING DEVICE INCLUDING A TAPE PULL-OUT MEMBER HAVING A PROJECTION FOR CONTACTING A RAMP SURFACE

This non-provisional application claims priority under 35 U.S.C., §119(a), on Patent Application No. 2003-088424 filed in Japan on Mar. 27, 2003, the entire contents of which are hereby incorporated by reference.

BACKGROUND OF THE INVENTION

1. Field of the Invention

The present invention relates to a magnetic recording and reproduction apparatus for performing information recording to, and/or information reproduction from, a magnetic tape which is wound around a rotatable head cylinder having a rotatable head over a prescribed angle. In particular, the present invention relates to a magnetic recording and reproduction apparatus having a mechanism for automatically pulling out the magnetic tape from a tape cassette and winding the magnetic tape around the rotatable head cylinder.

2. Description of the Related Art

Recently, size, weight and thickness reduction of video tape recorders have been actively pursued. Especially, a loading mechanism, which has a very complicated structure and includes a large number of components, significantly influences the size and cost of the video tape recorders. The development of the loading mechanism is very important.

Hereinafter, a tape loading mechanism in a conventional magnetic recording and reproduction apparatus will be described. One known loading mechanism for a magnetic recording and reproduction apparatus is disclosed in Japanese Patent No. 2701575, and described with reference to FIGS. 1, 2, 5, 6, 9, 10 and 15 of Japanese Patent No. 2701575. In FIG. 5 of Japanese Patent No. 2701575, reference numeral 14 represents a supply boat, and reference numeral 15 represents a take-in boat. The supply boat 14 and the take-in boat 15 are both tape pull-out members. The supply boat 14 has a supply loading roller post 8 provided thereon, and the take-in boat 15 has first and second take-in roller posts 10 and 11 provided thereon. The supply boat 14 is engaged with a supply ring gear 38 via a supply driving shaft 53, and the take-in boat 15 is engaged with a take-in ring gear 39 FIG. 6) via a take-in driving shaft 55. (FIG. 6 of Japanese Patent No. 2701575 shows the take-in boat 15 in detail.) The supply boat 14 is engaged so as to be movable along a supply loading guide 17, and the take-in boat 15 is engaged so as to be movable along a take-in loading guide 18. The supply boat 14 and the take-in boat 15 move from a pre-loading position (shown in FIG. 1 of Japanese Patent No. 2701575) to a post-loading position (shown in FIG. 2 of Japanese Patent No. 2701575), so as to pull out a tape from a cassette and wind the tape around a rotatable head cylinder (FIG. 1). Reference numeral 86 represents a stopper provided on a chassis 1 for positioning the supply boat 14 at the time of loading the tape. Reference numeral 87 represents a stopper provided on a chassis 1 for positioning the take-in boat 15 at the time of loading the tape.

A tape loading operation of the conventional magnetic recording and reproduction apparatus will be described with reference to FIGS. 9 and 10 of Japanese Patent No. 2701575. In FIGS. 9 and 10, reference numeral 30 represents a motor which is rotatable forward and backward. The rotation of the motor rotates the rings 38 and 39 counterclockwise and clockwise, respectively, via the gears in FIGS. 9 and 10.

Thus, the supply boat 14 (FIG. 5) engaged with the supply driving shaft 53 and the take-in boat 15 (FIG. 6) engaged with the take-in driving shaft 55 also rotates counterclockwise and clockwise, thereby pulling the magnetic tape out from the cassette. At a tape pull-out completion position where the magnetic tape has been completely pulled out, the supply boat 14 and the take-in boat 15 are pressed to the stoppers 86 and 87 (FIG. 5), thereby positioning the supply boat 14 and the take-in boat 15.

With reference to FIG. 15 of Japanese Patent No. 2701575, a positioning operation for the supply boat 14 and the take-in boat 15 will be described. FIG. 15 of Japanese Patent No. 2701575 shows a positioning operation of the loading boats in the conventional magnetic recording and reproduction apparatus. Here, the positioning operation of the supply boat 14 will be described as an example.

In FIG. 15 of Japanese Patent No. 2701575, (a) is a plan view, (b) is a side view, (c) is a bottom view, and (d) is a partial cross-sectional view. In FIG. 15, reference numeral 86 represents the stopper as described above. The stopper 86 includes a pin 86a and an inverted cone-shaped (tapered) pressing section 86b provided on the pin 86a. Reference numeral 14a is a V-shaped groove formed at a forward end of the supply boat 14. The V-shaped groove 14a has a ramp surface. A forward portion and a rear portion of the supply boat 14 has a reference plane. The reference planes contact a reference plane of the chassis 1 (FIG. 2 of Japanese Patent No. 2701575), and thus high precision positioning is realized. The reference plane of the chassis 1 is provided in the vicinity of the position of the supply boat 14 at a loading completion position (at which the tape loading is completed). As shown in FIGS. 5 and 15, the supply boat 14 is guided by the supply loading guide 17 as the supply ring gear 38 pivots. The V groove 14a contacts the stopper 86 at the loading completion position, and thus is positioned. More specifically, at the loading completion position, a driving force is constantly applied to the supply boat 14 via the supply driving shaft 53 in a direction of arrow P by the movement of a owing plate 45 (the operation of the swing plate 45 will not be described). Therefore, when the stopper 86 contacts the V-shaped groove 14a, the position of the supply boat 14 is restricted by the V-shaped groove 14a in a horizontal direction perpendicular to the advancing direction of the supply boat 14. (The advancing direction of the supply boat 14 is the direction of arrow P.) Since a force is also applied to the supply boat 14 in a direction of arrow F, the position of the supply boat 14 is restricted in the advancing direction and the opposite direction, and also in a vertical direction perpendicular to the advancing direction.

As described above, in the conventional magnetic recording and reproduction apparatus, the V-shaped grooves of the supply boat 14 and the take-in boat 15 (tape pull-out members) are pressed to the tapered pressing sections of the stoppers 86 and 87 provided on the chassis 1. Thus, the tilt of the loading roller posts 8, 10 and 11 provided in the supply and take-in boats 14 and 15 is precisely kept, and therefore the magnetic tape can be properly wound around the rotatable head cylinder.

The above-described magnetic recording and reproduction apparatus has the following problems.

The position and tilt of the supply boat 14 and the take-in boat 15 are influenced by the variance in the shape of the tapered pressing section of the stoppers 86 and 87. This heavily influences the stable running and protection of the magnetic tape. In order to control the supply boat 14 and the take-in boat 15 with very high precision, the stoppers 86 and 87 need to be processed with high precision. As a result, the stoppers 86 and 87 become expensive.

In the conventional magnetic recording and reproduction apparatus, the stoppers 86 and 87 are formed by being inserted into the chassis 1 by pressure. A slight variance in the height of the stoppers 86 and 87 with respect to the chassis 1 also influences the position and tilt of the supply and take-in boats 14 and 15. This also heavily influences the stable running and protection of the magnetic tape. The height of the stoppers 86 and 87 needs to be controlled with very high precision, and therefore the tape loading mechanism is difficult and expensive to assemble.

The stoppers 86 and 87 are constantly acted on by forces in a direction of pushing the stoppers 86 and 87 down and in a direction of pulling the stoppers 86 and 87 up, As such, the chassis 1 and the stoppers 86 and 87 need to have a certain strength. The portions of the chassis 1 which hold the stoppers 86 and 87 also need to have a certain strength which is kept over time. This inconveniently increases the size of the mechanism.

As described above, the tape loading mechanism in conventional magnetic recording and reproduction apparatuses, represented by the magnetic recording and reproduction apparatus described in Japanese Patent No. 2701575, requires high component precision and high assembly precision in order to control the boats with high precision. In order to guarantee a certain level of strength, the tape loading mechanism is inevitably large in size. For guaranteeing high level of performance and quality of the magnetic recording and reproduction apparatus, the size, weight and cost of the magnetic recording and reproduction apparatus cannot be reduced.

SUMMARY OF THE INVENTION

According to one aspect of the invention, a magnetic recording and reproduction apparatus includes a cylinder for performing information recording to, and/or reproducing information from, a magnetic tape; a chassis section having the cylinder provided thereon; a tape pull-out member pulling out the magnetic tape; a positioning member provided on a first surface of the chassis section, the positioning member having a ramp surface; and an urging section for urging the tape pull-out member. The tape pull-out member is movable between a first position and a second position. The first position is a position at which information recording to, and information reproduction from, the magnetic tape is possible. The second position is a position at which information recording to and information reproduction from, the magnetic tape is not possible. The tape pull-out member has a second surface facing the first surface. The tape pull-out member includes a projection provided on the second surface. The tape pull-out member is urged by the urging section such that the projection presses the ramp surface at the first position. A force received by the projection from the ramp surface, by the projection pressing the ramp surface, acts on the projection in a direction from the ramp surface toward the first surface.

According to another aspect of the invention, a magnetic recording and reproduction apparatus for performing information recording to, and/or information reproduction from, a tape which is run after being pulled out from a tape cassette and wound around a rotatable head cylinder is provided. The magnetic recording and reproduction apparatus includes a tape pull-out member which is located in an opening of the tape cassette in a tape cassette mounted state, and moves to a tape pull-out position in the vicinity of the rotatable head cylinder for pulling out the tape from the tape cassette and winding the tape around the rotatable head cylinder so as to place the magnetic recording and reproduction apparatus into a tape pull-out state. The tape cassette mounted state is a state of the magnetic recording and reproduction apparatus in which the tape cassette is mounted thereon, and the tape pull-out state is a state of the magnetic recording and reproduction apparatus in which the tape has been pulled out from the tape cassette and wound around the rotatable head cylinder such that the tape is capable of running. The magnetic recording and reproduction apparatus further includes a guide member for guiding the tape pull-out member to reciprocally move between a position in the opening of the tape cassette and the tape pull-out position; and a positioning member for positioning the tape pull-out member at the tape pull-out position. The tape pull-out member includes a guide pole for guiding the tape; a brim portion provided on a bottom surface of the tape pull-out member; a positioning projection provided on the bottom surface of the tape pull-out member; and a pull-out-side reference surface for determining a tilt of the tape pull-out member at the tape pull-out position. The positioning member includes a top reference surface located in a top surface of the positioning member and facing the pull-out-side reference surface of the tape pull-out member for controlling the tilt of the tape pull-out member; and a ramp surface which contacts the projection at the tape pull-out position and which has a normal defined by a negative Y component and a negative Z component at the tape pull-out position. An X-Y plane is a plan determined by the top reference surface, a positive Y direction is a direction in which the tape pull-out member advances toward the tape pull-out position, the negative Y direction is the opposite direction to the positive Y direction, a Z axis is a straight line which is perpendicular to the X-Y plane and passes through the center of the guide pole, and a positive Z direction is a direction from the top reference surface to the tape, and the negative Z direction is the opposite direction to the positive Z direction. The projection of the tape pull-out member is urged to be pressed onto the ramp surface by an urging section provided on a chassis at the tape pull-out position, so as to position the tape pull-out member.

In one embodiment of the invention, the guide pole, the brim portion and the positioning projection are integrally formed together.

In one embodiment of the invention, the guide pole, the brim portion and the positioning projection are integrally formed together of a resin.

Thus, the invention described herein makes possible the advantages of providing a magnetic recording and reproduction apparatus including a light, compact, and high performance tape loading mechanism including a smaller number of components. Such a magnetic recording and reproduction apparatus is realized by contact of a projection provided on a bottom surface of a tape pull-out member and a ramp surface of a positioning member provided on a main chassis.

These and other advantages of the present invention will become apparent to those skilled in the art upon reading and understanding the following detailed description with reference to the accompanying figures.

BRIEF DESCRIPTION OF THE DRAWINGS

FIGS. 4A through 4F are plan views illustrating an operation of the sub chassis of the magnetic recording and reproduction apparatus according to the present invention;

DESCRIPTION OF THE PREFERRED EMBODIMENTS

Hereinafter, the present invention will be described by way of illustrative examples with reference to FIGS. 1 through 9.

A magnetic recording and reproduction apparatus includes a main chassis and a sub chassis. Namely, the magnetic recording and reproduction apparatus according to the present invention has a two-chassis structure.

Figure 1:
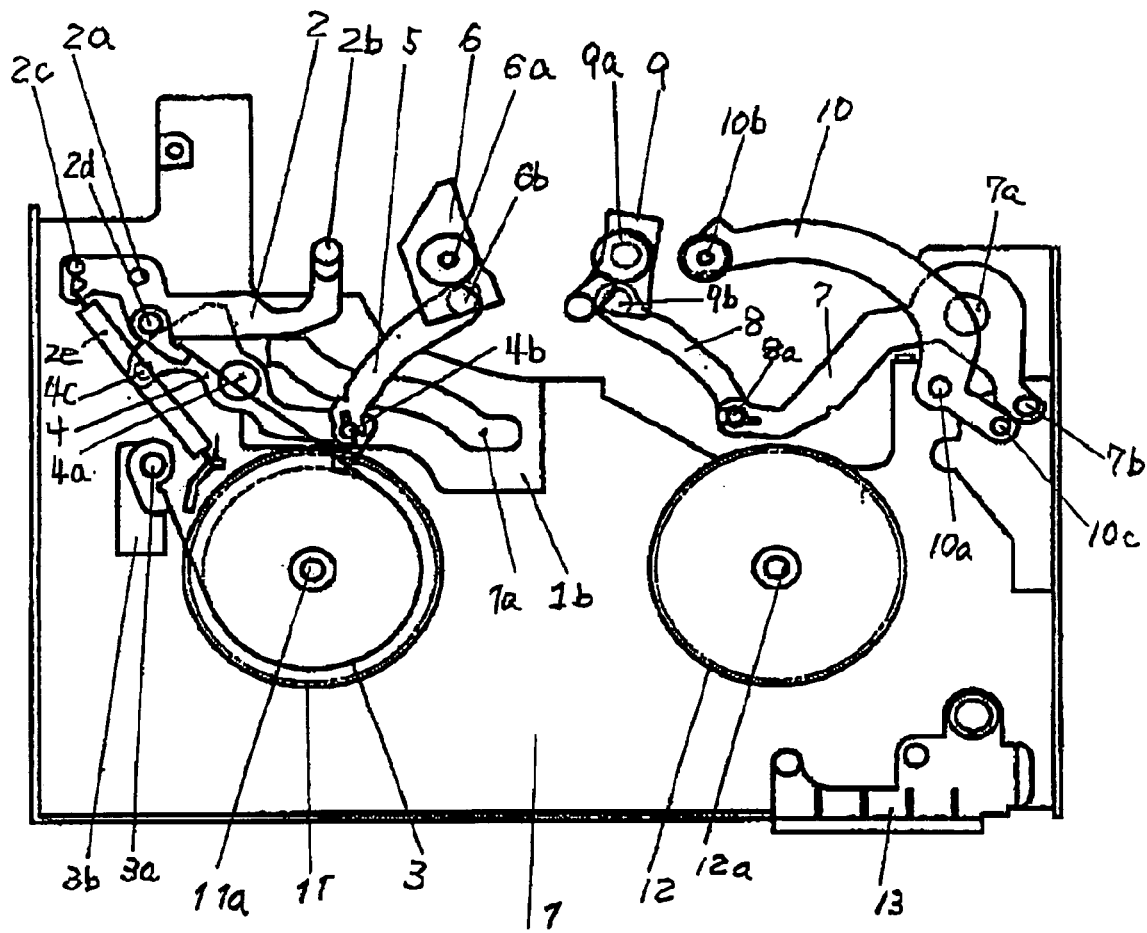
FIG. 1 is a plan view of a sub chassis of a magnetic recording and reproduction apparatus according to the present invention.

First, a structure of a sub chassis 1 of the magnetic recording and reproduction apparatus will be described. FIG. 1 is a plan view of the sub chassis 1.

A sub chassis 1 has a TR arm 2, an S boat 6, a T boat 9 and a T3 arm 10 provided thereon. These tape pull-out members 2, 6, 9 and 10 act to pull out a magnetic tape (not shown in FIG. 1) from a tape cassette.

The TR arm 2 is supported so as to be pivotable about a support 2a on the sub chassis 1. A TR post 2b is provided on a top surface of one end of the TR arm 2, and a TR arm driving pin 2c is provided on a bottom surface of the other end of the TR arm 2.

The T3 arm 10 is supported so as to be pivotable about a support 10a on the sub chassis 1. A T3 post 10b is provided on a top surface of one end of the T3 arm 10, and a T3 arm driving pin 10c is provided on a bottom surface of the other end of the T3 arm 10.

An S arm 4 is supported so as to be pivotable about a support 4a on the sub chassis 1. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S lint 5 via a boss 6b (brim portion).

A T arm 7 has substantially the same structure as that of the S arm 4. Specifically, the T arm 7 is supported to be pivotable about a support 7a on the sub chassis 1. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a (guide pole) provided thereon for guiding the magnetic tape, and the T boat 9 has a T roller post 9a (guide pole) provided thereon for guiding the magnetic tape.

As described above, all the tape pull-out members 2, 6, 9 and 10 are provided on the sub chassis 1.

An S reel stand 11 and a T reel stand 12 are supported so as to be pivotable about a shaft 11a and a shaft 12a, respectively. The S reel stand 11 and the T reel stand 12 are engaged with respective reel hubs of the tape cassette (not shown) when the tape cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a (cam groove) is formed. The sub chassis adjusting plate 1b is secured to the sub chassis 1 by a screw (not shown).

Figure 2:
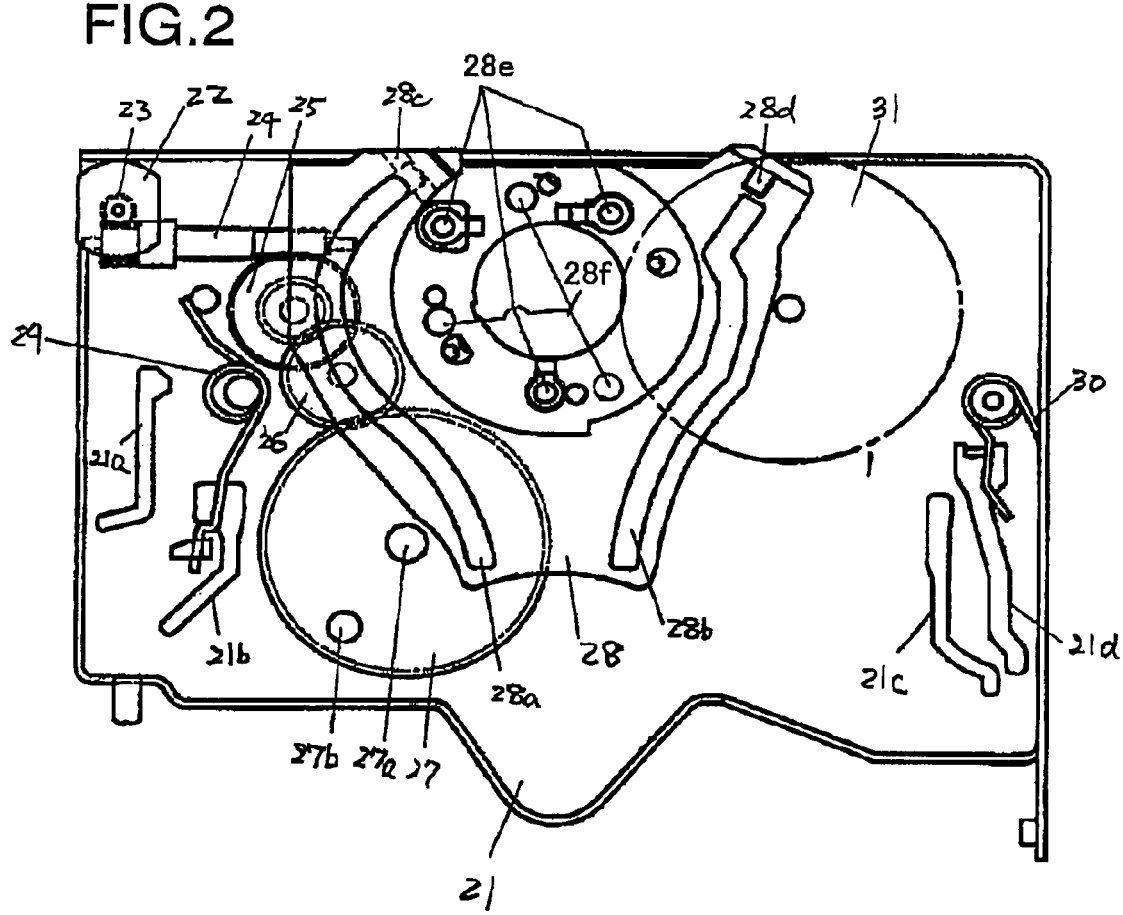
FIG. 2 is a plan view of a main chassis of the magnetic recording and reproduction apparatus according to the present invention.

Next, a structure of a main chassis 21 (chassis section) of the magnetic recording and reproduction apparatus according to the present invention will be described. FIG. 2 is a plan view of the main chassis 21.

The main chassis 21 has four cam grooves 21a, 21b, 21c and 21d formed therein.

A motor 22 is rotatable forward and backward. A rotation force of the motor 22 is conveyed to a mode gear 27 via a motor worm 23, a connection worm 24, and gears 25 and 26. The mode gear 27 is rotatable about a support 27a. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

A cylinder base 28 (positioning member) is secured to a top surface of the main chassis 21 (first surface) via three cylinder screw holes 28e. A cylinder (not shown) is provided on the cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 1 when the S boat 6 and the T boat 9 pull out the magnetic tape from the tape cassette. Elastic twisted coil springs 29 and 30 (urging sections) are secured on the main chassis 21 in the state of being provided with a pressure by a prescribed force.

Figure 3:
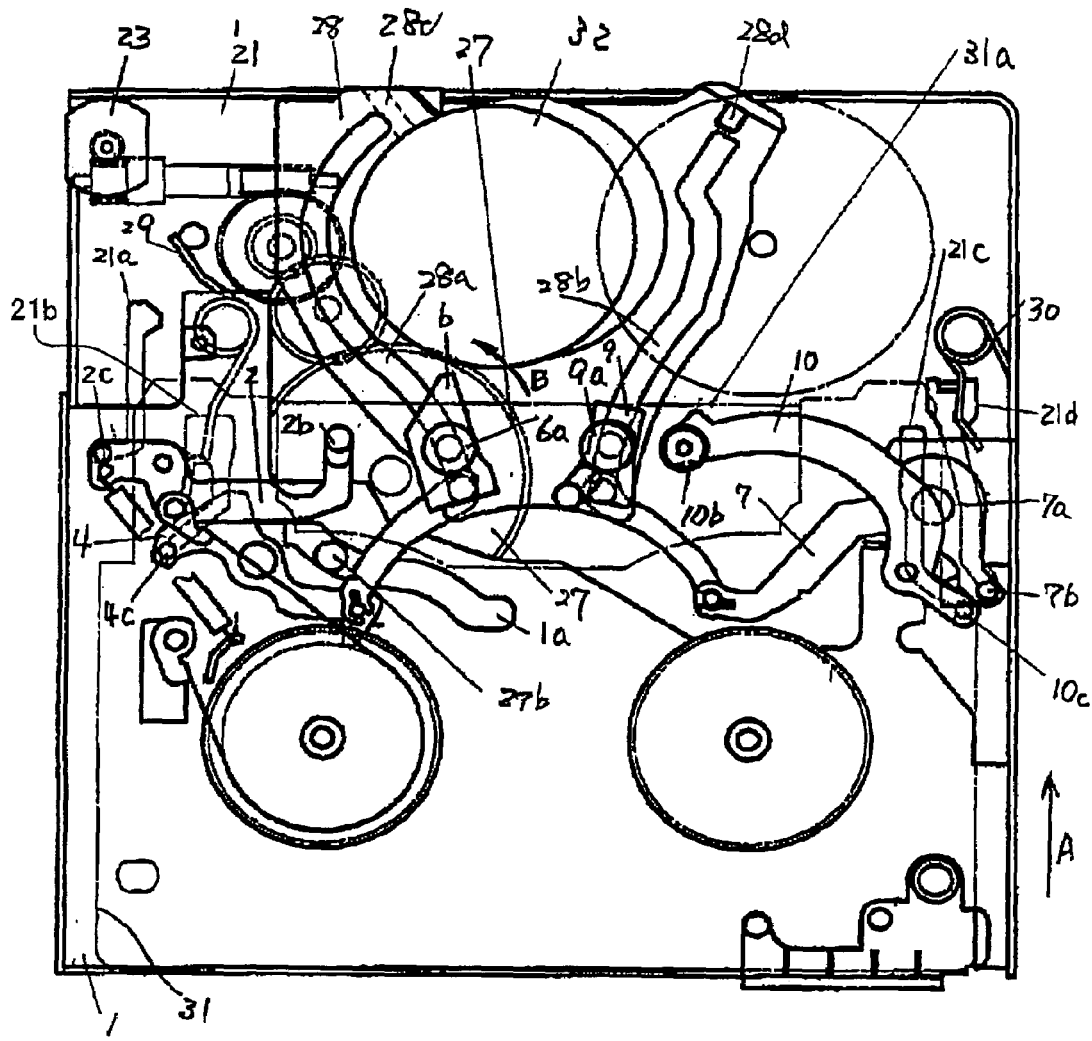
FIG. 3 is a plan view of the magnetic recording and reproduction apparatus according to the present invention in a state where a tape cassette can be mounted on, or taken out from, the sub chassis.

FIG. 3 is a plan view of the magnetic recording and reproduction apparatus according to the present invention, which is obtained by placing the sub chassis 1 shown in FIG. 1 on the main chassis 21 shown in FIG. 2.

In this specification, a state of the magnetic recording and reproduction apparatus where a tape cassette is mounted on the sub chassis 1 but a tape has not been pulled out from the tape cassette as shown in FIG. 3 is referred to as a "tape cassette mounted state". In this state, the sub chassis 1 is at a tape cassette mounted position. A state of the magnetic recording and reproduction apparatus where the tape has been pulled out from the tape cassette and wound around the rotatable head cylinder 32 (FIG. 5) to be ready to run is referred to as a "tape pull-out completion state". The rotatable head cylinder 32 is used for recording information to, and/or reproducing information from, the magnetic tape.

The sub chassis 1 is guided so as to be movable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 3 is slidably engaged with the cam groove 21a of the main chassis 21. The S arm driving pin 4c of the S arm 4 is engaged with the cam groove 21b of the main chassis 21. The T arm driving pin 7b of the T arm 7 is engaged with the cam groove 21d of the main chassis 21.

The sub chassis driving pin 27b on the mode gear 27 on the main chassis 21 is engaged with the groove 1a of the sub chassis adjusting plate 1b (FIG. 1).

With reference to FIG. 3, an operation of the magnetic recording and reproduction apparatus according to the present invention will be described.

As described above, in FIG. 3, the magnetic recording and reproduction apparatus is in the state where a tape cassette can be mounted on the sub chassis 1. In this state, the posts 2b, 6a, 9a and 10b of the tape pull-out members 2, 6, 9 and 10 are all inside the perimeter of the magnetic tape 31a, i.e., in the opening of the tape cassette. When the motor 22 rotates in this state, the mode gear 27 rotates in a direction represented by arrow B, and the sub chassis driving pin 27b also moves in the direction of arrow B. The sub chassis driving pin 27b moves in the groove 1a of the sub chassis adjusting plate 1b, which moves the sub chassis 1 in the direction of arrow A.

With reference to FIGS. 4A through 4F, an operation of the sub chassis 1 driven by the mode gear 27, i.e., an operation of the sub chassis adjusting plate 1b secured to the sub chassis 1 will be described.

In FIG. 4A, the sub chassis driving pin 27b is at a tape cassette take-out position 27b1 (the same position as in FIG. 3). As shown in FIG. 4A, the groove 1a of the sub chassis adjusting plate 1b includes an arc portion L (first arc portion), an arc portion M (second arc portion) continuous with the arc portion L, and a straight portion N continuous with the arc portion M. The arc portion L and the arc portion H are projected in opposite directions from each other.

In FIG. 4B, the sub chassis driving pin 27b is at a tape cassette insertable position 27b2. The sub chassis driving pin 27b, which is at the position 27b1 in FIG. 4A, has been moved in the arc portion L and is located at the position 27b2 in FIG. 4B. The shape of the arc portion L is the same as the shape of an arc having the center thereof at the support 27a, about which the mode gear 27 is rotatable. The arc portion L is concentric with an arc drawn by the movement of the sub chassis driving pin 27b about the center of the mode gear 27. More specifically, the radius of the arc portion L is the same as the radius of an arc drawn by the center of the sub chassis driving pin 27b when the sub chassis driving pin 27b moves about the center of the mode gear 27. Therefore, the sub chassis adjusting plate 1b does not move in the direction of arrow A. The sub chassis adjusting plate 1b does not move since the sub chassis 1 needs to be paused between when the sub chassis driving pin 27b is at the tape cassette take-out position and when the sub chassis driving pin 27b is at the tape cassette insertable position.

When the mode gear 27 further rotates in the direction of arrow B, the sub chassis driving pin 27b moves to a position 27b3 in the arc portion M as shown in FIG. 4C. In the state of FIG. 4C, the tape is being pulled out from the tape cassette.

Since the arc portion M is not concentric with an arc drawn by the movement of the sub chassis driving pin 27b about the center of the mode gear 27, the sub chassis adjusting plate 1b is pushed by the sub chassis driving pin 27b so as to move in the direction of arrow A. This means that the sub chassis 1 also moves in the direction of arrow A.

When the mode gear 27 further rotates in the direction of arrow B, the sub chassis driving pin 27b reaches a position 27b4, where the sub chassis driving pin 27b is in engagement with the straight portion N, as shown in FIG. 4D. The sub chassis 1 continuously moves in the direction of arrow A. In the state of FIG. 4D, the tape is still being pulled out from the tape cassette.

When the mode gear 27 further rotates in the direction of arrow B, the sub chassis driving pin 27b reaches a stop position 27b5 in the arc portion M as shown in FIG. 4E. In this state, the arc portion H is concentric with an arc drawn by the movement of the sub chassis driving pin 27b about the center of the mode gear 27. More specifically, the radius of the arc portion M is the same as the radius of an arc drawn by the center of the sub chassis driving pin 27b when the sub chassis driving pin 27b moves about the center of the mode gear 27. Therefore, the sub chassis adjusting plate 1b is in a pause without moving in the direction of arrow A.

In the state of FIG. 4E, the sub chassis driving pin 27b is at the stop position 27b5. In this state, the tape has been completely pulled out, and the sub chassis 1 is at the utmost position (a tape pull-out completion position), as described below with reference to FIG. 6. The sub chassis 1 cannot move any further from this state. The mode gear 27 further rotates in the direction of arrow B in order to obtain a play mode in which the magnetic tape can run.

Since the sub chassis driving pin 27b is in the arc portion M which is concentric with an arc drawn by the movement of the sub chassis driving pin 27b about the center of the mode gear 27, the sub chassis adjusting plate 1b does not move in the direction of arrow A. After that, the sub chassis driving pin 27b reaches a play position 27b6 as shown in FIG. 4F. The play position is also referred to as a tape running position.

When the mode gear 27 rotates in the opposite direction from the direction of arrow B, the above-mentioned components also move in the opposite directions from those described above and the sub chassis 1 adjusting plate 1b moves in the opposite direction from the direction of arrow A.

As described above, in a simple structure where the sub chassis driving pin 27b is provided on the mode gear 27 which is rotatable, the sub chassis 1 can be stopped during a prescribed period and subsequently start moving, with the groove 1a of the sub chassis adjusting plate 1b being specifically shaped. Since the width of the groove 1a can be substantially the same as the diameter of the sub chassis driving pin 27b, the sub chassis 1 can be stably driven with no need to provide any extra gap between the groove 1a and the sub chassis driving pin 27b.

With reference to FIGS. 3 through 6, an operation of pulling out the magnetic tape from the tape cassette by relative movement of the sub chassis 1 with respect to the main chassis 21 will be described.

Figure 5:
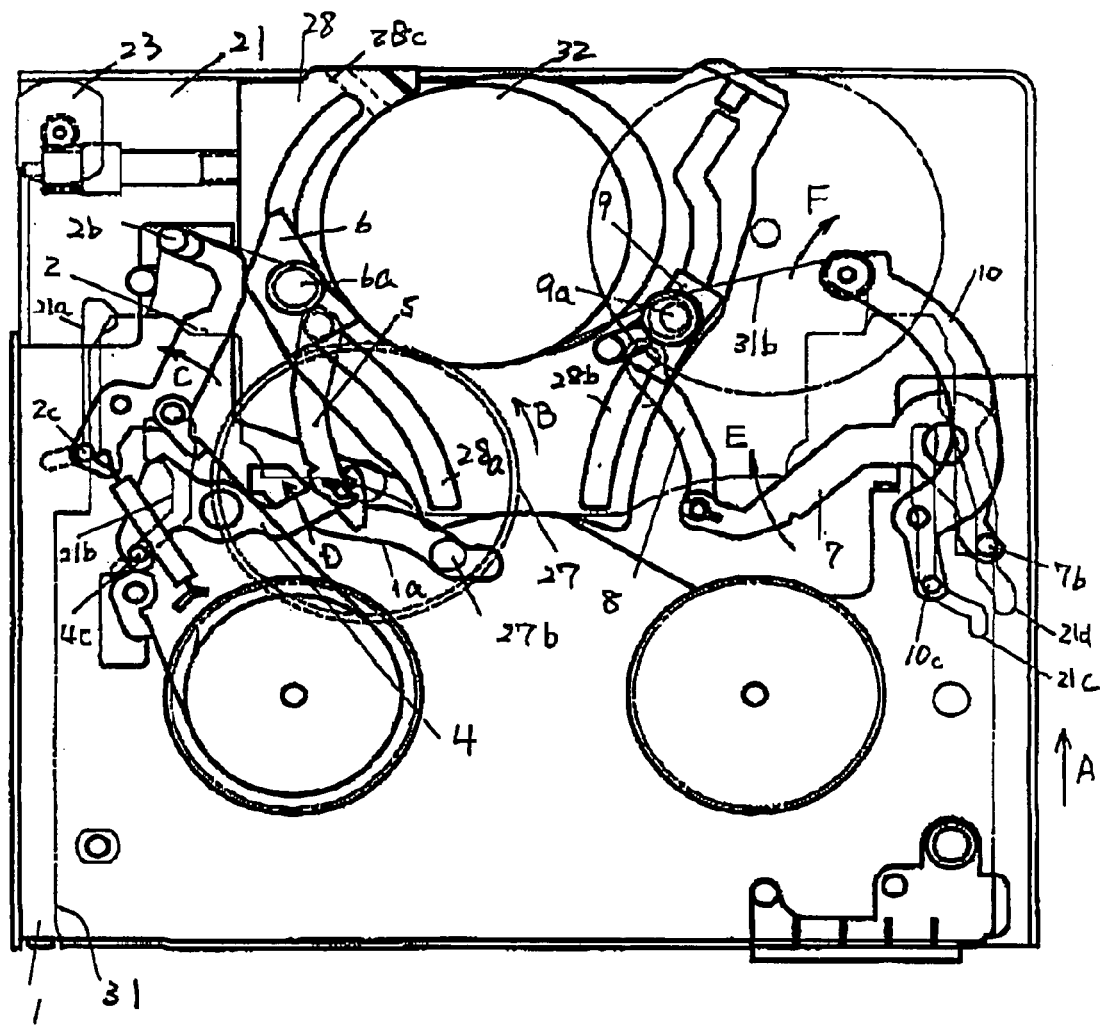
FIG. 5 is a plan view of the magnetic recording and reproduction apparatus according to the present invention in a state where the magnetic tape is being pulled out from the tape cassette.

FIG. 5 shows a state of the magnetic recording and reproduction apparatus where the sub chassis 1 moves in the direction of arrow A slightly from the state shown in FIG. 3. In FIG. 5, the sub chassis driving pin 27b and the groove 1a of the sub chassis adjusting plate 1b have the positional relationship shown in FIG. 4C. The sub chassis driving pin 27b reaches the position 27b3 shown in FIG. 4C by the movement of the mode gear 27 in the direction of arrow B.

Figure 6:
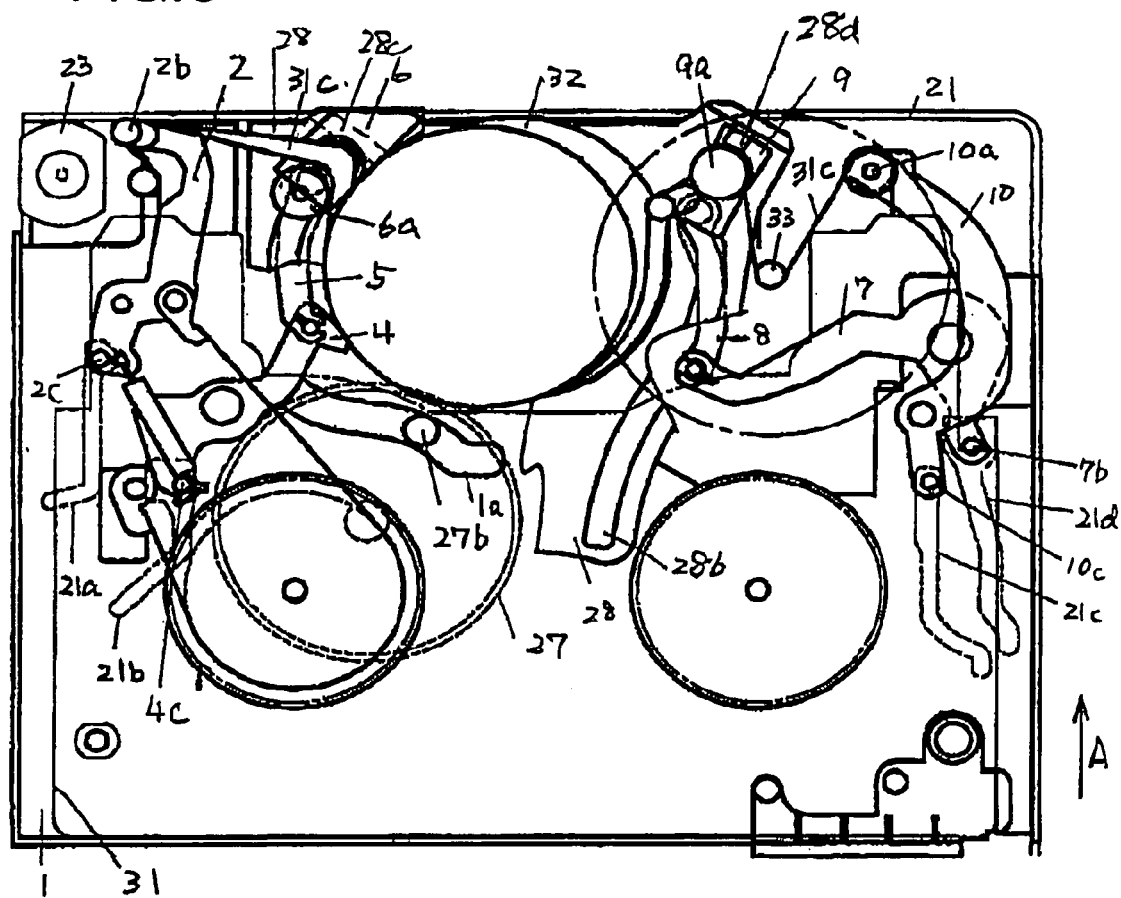
FIG. 6 is a plan view of the magnetic recording and reproduction apparatus according to the present invention in a state where the magnetic tape has been completely pulled out from the tape cassette.

The S boat 6 and the T boat 9 are movable between a first position and a second position. The first position is a position where information recording to, and/or information reproduction from, the tape is possible. The second position is a position where information recording to, and/or information reproduction from, the tape is not possible. In FIG. 6, the S boat 6 and the T boat 9 are at the second position.

In FIG. 5, as described above, the driving pins 2c, 4c, 7b and 10c of the elements 2, 4, 7 and 10 are respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b to move to the positions shown in FIG. 5. As a result, the magnetic tape is pulled out to the position as represented by reference numeral 31b.

FIG. 6 shows a state of the magnetic recording and reproduction apparatus, in which information recording to, or information reproduction from, the magnetic tape (represented by reference numeral 31c) is possible. In this state, the S boat 6 and the T boat 9 are at the first position. The sub chassis 1 is at the tape pull-out completion position. This state is obtained from the state in FIG. 5 as a result of the mode gear 27 further rotating in the direction of arrow B, the sub chassis 1 further moving in the direction of arrow A, and the tape 31b being wound around a rotatable head cylinder 32 provided on the cylinder base 28 on the main chassis 21. In FIG. 6, the sub chassis driving pin 27b and the groove 1a of the sub chassis adjusting plate 1b have the positional relationship shown in FIG. 4E. Therefore, the sub chassis 1 stays at this position although the mode gear 27 further rotates in the direction of arrow B, and the pinch roller (not shown) presses the magnetic tape 31c to a capstan shaft 33 and the capstan shaft 33 rotates to place the magnetic recording and reproduction apparatus into the play mode in which the magnetic tape 31c is driven.

In the state shown in FIG. 6, the S boat 6 acting to pull out the magnetic tape from the tape cassette is pressed to a positioning member 28c via the S arm 4 and the S link 5 via the twisted coil spring 29 (FIG. 2) and thus the position of the S boat 6 is determined. Similarly, the T boat 9 also acting to pull out the magnetic tape from the tape cassette is pressed to a positioning member 28d via the T arm 7 and the T link 8 via the twisted coil spring 30 (FIG. 2) and thus the position of the T boat 9 is determined.

With reference to FIGS. 7 and 8A through 8C, such a pressing positioning mechanism will be described.

Figure 7:
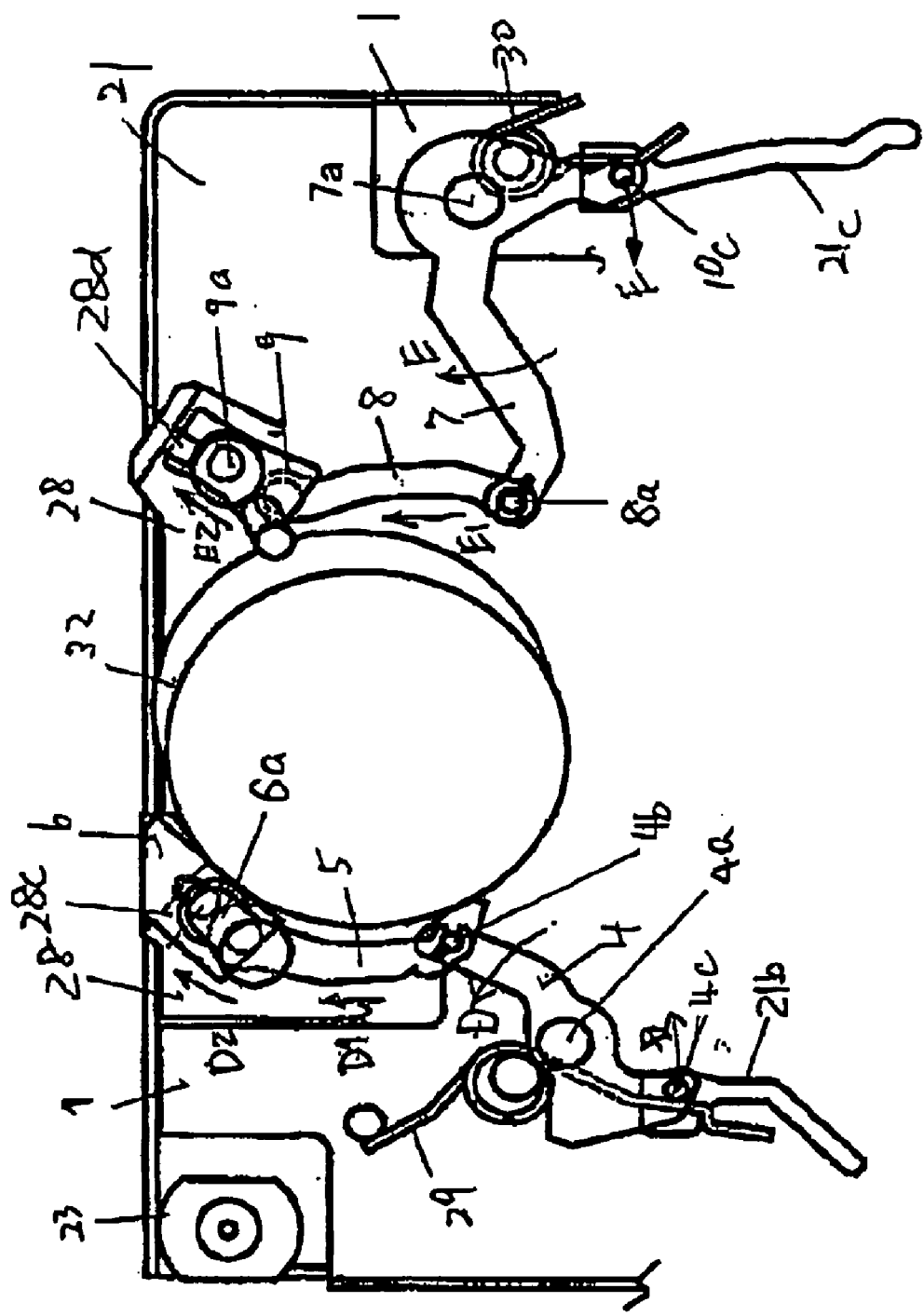
FIG. 7 is a partial view of FIG. 6 illustrating a positioning mechanism of the magnetic recording and reproduction apparatus.

FIG. 7 is a partial view of FIG. 6. With reference to FIG. 7, a method for determining the position of the S boat 6 will be described.

The S arm 4 on the sub chassis 1 reaches the position shown in FIG. 7 by the S arm driving pin 4c being guided by the cam groove 21b in the main chassis 21. In this state, the S arm driving pin 4c is in contact with the elastic twisted coil spring 29 mounted on the main chassis 21 and is flexed. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning member 28c on the cylinder base 28 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning member 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figure 8A:
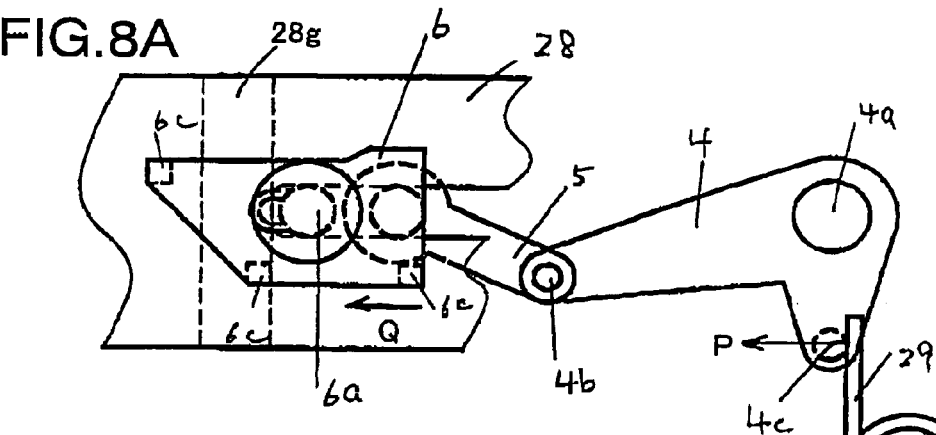
FIG. 8A is a plan view of the positioning mechanism shown in FIG. 7.
Figure 8B:
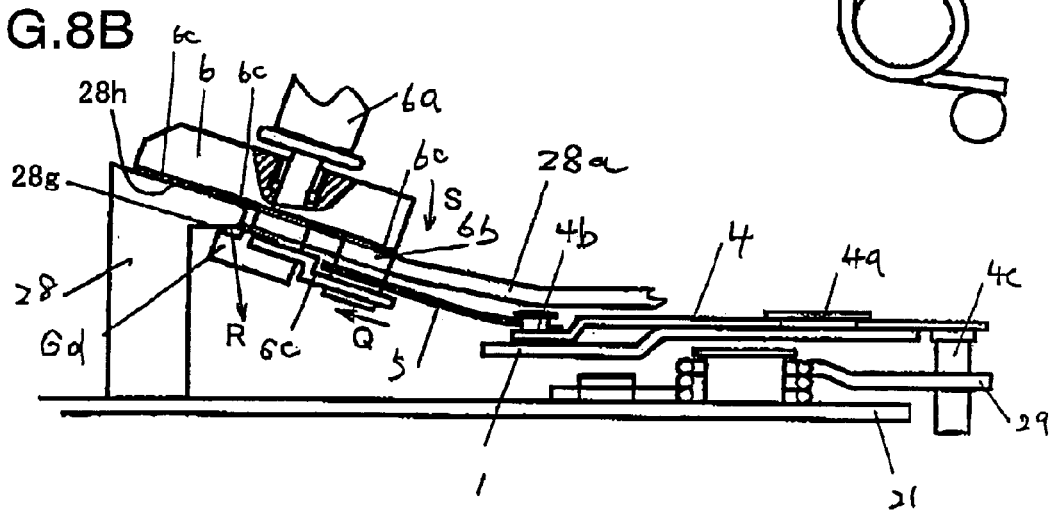
FIG. 8B is a side view thereof.
Figure 8C:
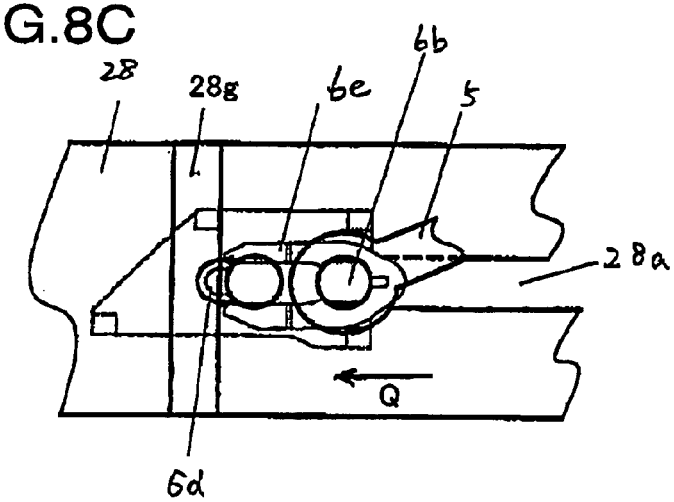
FIG. 8C is a bottom view thereof.

With reference to FIGS. 8A through 8C, the positioning mechanism for the S boat 6 will be described in more detail.

FIG. 8A is a plan view of the positioning mechanism for the S boat 6, FIG. 8B is a side view thereof, and FIG. 8C is a bottom view thereof. In FIGS. 8A through 8C, the elements are shown schematically.

The S arm 4 is urged by the elastic coil spring 29 in a direction represented by arrow P. Thus, a portion of the boss 6b which is below the guide groove 28a is pressed by the S link 5 (FIG. 8B). The S boat 6 includes a projection 6d having a semi-circular planar shape (FIG. 8C) integrally provided at a forward position on a bottom of the S boat 6 (second surface). The cylinder base 28 has a ramp surface 28g on a bottom surface thereof in the vicinity of the cylinder (not shown). The ramp surface 28g is provided such that a normal thereto is in a direction of arrow R.

With reference to FIGS. 8A through 8C, an operation of the positioning mechanism for the S boat 6 will be described.

The lower portion of the boss 6b engaged with the S boat 6 is pressed by the S link 5, and thus the projection 6d of the S boat 6 is pressed to the ramp surface 28g of the cylinder base 28. Accordingly, the entire S boat 6 is pressed in the direction of arrow Q while receiving a force in the direction of arrow R. Since the boss 6b is pressed in the direction of arrow Q, the S boat 6 also receives a force in a direction of arrow S. As a result, three reference points 6c (tape pull-out-side reference surfaces) on the bottom surface of the S boat 6 contact a top reference surface 28h of the cylinder base 28. The top reference surface 28h of the cylinder base 28 and the reference points 6c on the bottom surface of the S boat 6 are formed with high precision. By contact of the top reference surface 28h of the cylinder bass 28 and the reference points 6c on the bottom surface of the S boat 6, the S boat 6 is positioned with respect to the cylinder base 28 with high precision.

The ramp surface 28g has a normal represented by arrow R which is defined by a negative Y component and a negative Z component at a tape pull-out position. An X-Y plane is a plane determined by the top surface 28h, a positive Y directions a direction in which the S boat 6 advances toward the tape pull-out position (represented by arrow Q), the negative Y direction is the opposite direction to the positive Y direction, a Z axis is a straight line which is perpendicular to the X-Y plane and passes through the center of the S roller post 6*a*, and a positive Z direction is a direction from the top surface 28*h* to the tape, and the negative Z direction is the opposite direction to the positive Z direction.

As described above, the S boat 6 is urged by the coil spring 29 such that the projection 6*d* presses the ramp surface 28*g* at the first position. A force received by the projection 6*d* from the ramp surface 28*g*, as a result of the projection 6*d* pressing the ramp surface 28*g*, acts on the projection 6*d* in a direction from the ramp surface 28*g* toward the top surface of the main chassis 21.

As described above, the S boat 6, which is a tape pull-out member, can be positioned with high precision by a compact and low-cost simple structure with a small number of components, i.e. by a structure of integrally providing the projection 6*d* in the S boat 6 and providing the ramp surface 28*g* in the cylinder base 28. The S roller post 6*a* is provided on the S boat 6. The tilt of the S roller post 6*a* with respect to the main chassis 21 is very important for tape running. An abnormal tilt of the S roller post 6*a* heavily influences the running of the magnetic tape, and possibly damages recorded images and sounds and also the magnetic tape itself.

The positioning mechanism for the T boat 9 has substantially the same structure and operates in substantially the same manner as described above regarding the S boat 6.

Figure 9:
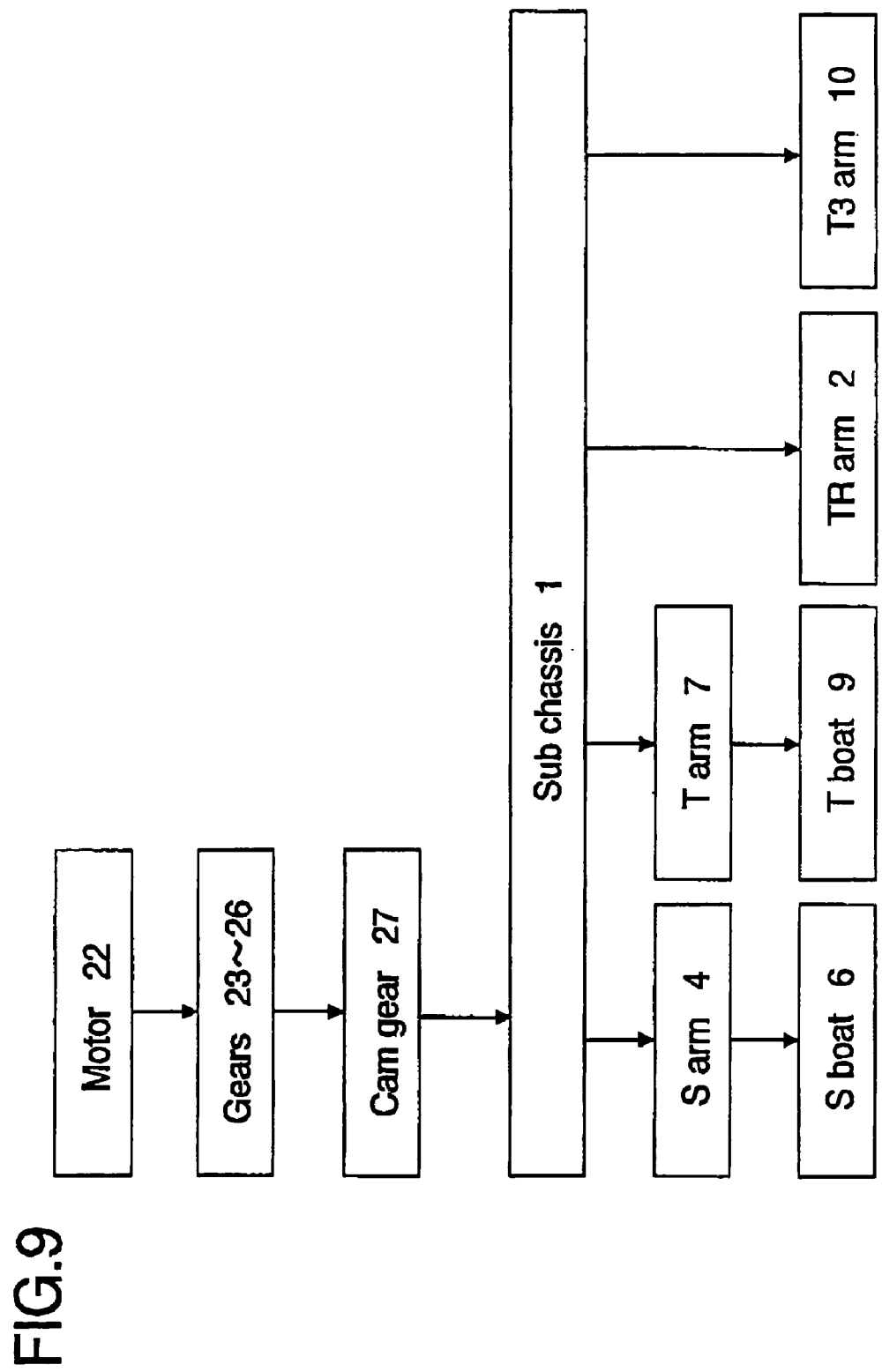
FIG. 9 shows a flow of force generated by a motor of the magnetic recording and reproduction apparatus according to the present invention.
Figure 10:
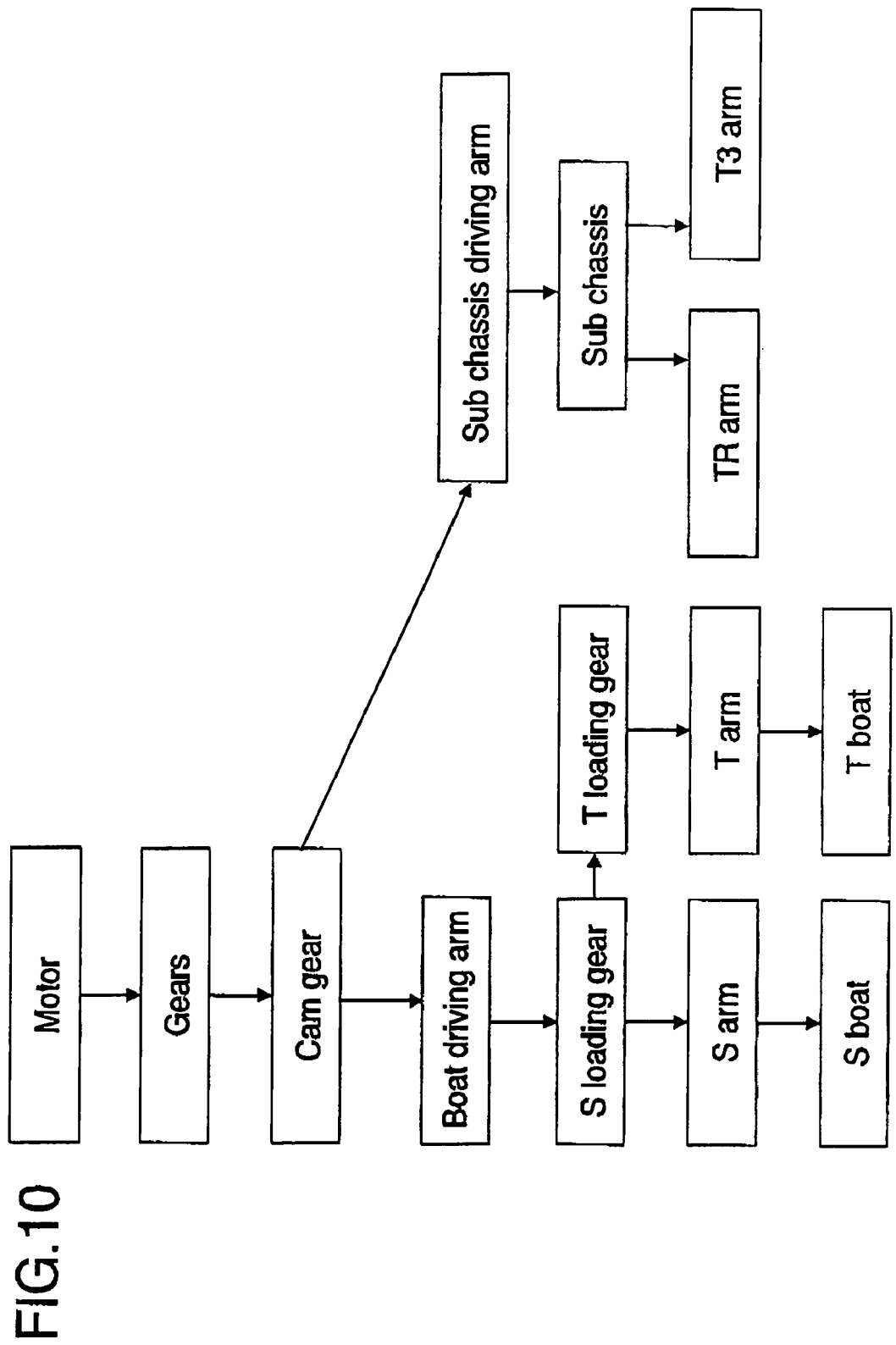
FIG. 10 shows a flow of force generated by a motor of a conventional magnetic recording and reproduction apparatus.

FIG. 9 shows a flow of a driving force in the magnetic recording and reproduction apparatus according to the present invention. As compared to the flow of a driving force in the conventional magnetic recording and reproduction apparatus shown in FIG. 10, the force generated by the motor in the magnetic recording and reproduction apparatus is streamlined according to the present invention. A simple flow of force by which elements acting for pulling out a magnetic tape from the tape cassette are moved by the movement of the sub chassis is realized.

According to the present invention, as described above, elements which are important for the performance of the magnetic recording and reproduction apparatus can be positioned with high precision with a very simple structure. This allows the number of required components and the size of the apparatus to be reduced and also contributes to the improvement of the quality of the apparatus.

In the above example, the twisted coil springs 29 and 30 are used as elastic members. The same effect is provided by using any elastic members such as, for example, leaf springs or resin springs.

In the above example, the main chassis 21 has four cam grooves. The same effect is provided by forming projections instead of grooves.

According to the present invention, when a tape pull-out member is at a position where information recording to, and/or information reproduction from, a magnetic tape is possible, the projection provided on the tape pull-out member presses the ramp surface of the positioning member. A force received by the projection from the ramp surface as a result of this pressing action acts on the projection in a direction from the ramp surface to the top surface of the main chassis. Thus, at the position where information recording and/or reproduction is possible, the tape pull-out member can be pressed on the top surface of the main chassis. Consequently, the tape pull-out member can be positioned to the top surface of the main chassis with certainty. According to the present invention, the positioning member for positioning the tape pull-out member can have a very simple structure.

In the case where the guide pole, the brim portion and the projection of the tape pull-out member is integrally formed together or integrally formed together of a resin, the number of components of the tape pull-out member is reduced and the tape pull-out member can have a very simple structure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:

a cylinder for performing information recording to, and/or reproducing information from, a magnetic tape;

a chassis section having the cylinder provided thereon;

a tape pull-out member pulling out the magnetic tape;

a positioning member provided on a first surface of the chassis section, the positioning member having a ramp surface; and an urging section for urging the tape pull-out member; wherein:

the tape pull-out member is movable between a first position and a second position;

the first position is a position at which information recording to, and information reproduction from, the magnetic tape is possible;

the second position is a position at which information recording to, and information reproduction from, the magnetic tape is not possible;

the tape pull-out member has a second surface facing the first surface;

the tape pull-out member includes a projection provided on the second surface;

the tape pull-out member is urged by the urging section such that the projection presses the ramp surface at the first position; and a force received by the projection from the ramp surface, by the projection pressing the ramp surface, acts on the projection in a direction from the ramp surface toward the first surface.

2. A magnetic recording and reproduction apparatus for performing information recording to, and/or information reproduction from, a tape which is run after being pulled out from a tape cassette and wound around a rotatable head cylinder, the magnetic recording and reproduction apparatus comprising:

a tape pull-out member which is located in an opening of the tape cassette in a tape cassette mounted state, and moves to a tape pull-out position in the vicinity of the rotatable head cylinder for pulling out the tape from the tape cassette and winding the tape around the rotatable head cylinder so as to place the magnetic recording and reproduction apparatus into a tape pull-out state; where the tape cassette mounted state is a state of the magnetic recording and reproduction apparatus in which the tape cassette is mounted thereon, and the tape pull-out state is a state of the magnetic recording and reproduction apparatus in which the tape has been pulled out from the tape cassette and wound around the rotatable head cylinder such that the tape is capable of running;

a guide member for guiding the tape pull-out member to reciprocally move between a position in the opening of the tape cassette and the tape pull-out position; and a positioning member for positioning the tape pull-out member at the tape pull-out position;

wherein:

the tape pull-out member includes:

a guide pole for guiding the tape;

a brim portion provided on a bottom surface of the tape pull-out member;

a positioning projection provided on the bottom surface of the tape pull-out member; and a pull-out-side reference surface for determining a tilt of the tape pull-out member at the tape pull-out position; and the positioning member includes:

a top reference surface located in a top surface of the positioning member and facing the pull-out-side reference surface of the tape pull-out member for controlling the tilt of the tape pull-out member; and a ramp surface which contacts the projection at the tape pull-out position and which has a normal defined by a negative Y component and a negative Z direction at the tape pull-out position;

where an X-Y plane is a plane defined by the top reference surface, a positive Y direction is a direction in which the tape pull-out member advances toward the tape pull-out position, the negative Y direction is the opposite direction to the positive Y direction, a Z axis is a straight line which is perpendicular to the X-Y plane and passes through the center of the guide pole, and a positive Z direction is a direction from the top reference surface to the tape, and the negative Z direction is the opposite direction to the positive Z direction;

wherein the projection of the tape pull-out member is urged to be pressed onto the ramp surface by an urging section provided on a chassis at the tape pull-out position, so as to position the tape pull-out member.

3. A magnetic recording and reproduction apparatus according to claim 2, wherein the guide pole, the brim portion and the positioning projection are integrally formed together.

4. A magnetic recording and reproduction apparatus according to claim 2, wherein the guide pole, the brim portion and the positioning projection are integrally formed together of a resin.

* * * * *